United States Patent [19]

Roberts et al.

[11] Patent Number: 4,823,043

[45] Date of Patent: Apr. 18, 1989

[54] LENS PIPE ARC LAMP

[75] Inventors: Roy D. Roberts, Newark; Norman L. Young, Felton, both of Calif.

[73] Assignee: ILC Technology, Inc., Sunnyvale, Calif.

[21] Appl. No.: 97,255

[22] Filed: Sep. 17, 1987

Related U.S. Application Data

[63] Continuation-in-part of Ser. No. 901,800, Aug. 29, 1986, abandoned.

[51] Int. Cl.$^4$ .................... H01J 17/26; H01J 61/28
[52] U.S. Cl. ..................... 313/231.61; 313/231.71
[58] Field of Search ............. 313/111, 231.71, 231.61, 313/231.41; 350/96.18, 96.26, 96.34, 96.23

[56] References Cited

U.S. PATENT DOCUMENTS

| | | | |
|---|---|---|---|
| 3,512,030 | 5/1970 | Levy | 313/231.61 |
| 3,581,140 | 5/1971 | Poquette | 313/111 |
| 3,770,338 | 11/1973 | Helmuth | 313/111 |
| 3,950,075 | 4/1976 | Cook et al. | 350/96.18 |
| 4,082,423 | 4/1978 | Glista et al. | 350/96.23 |
| 4,380,365 | 4/1983 | Gross | 350/96.18 |
| 4,679,934 | 7/1987 | Ganguly et al. | 356/45 |

Primary Examiner—Theodore M. Blum
Assistant Examiner—Gregory C. Issing
Attorney, Agent, or Firm—Thomas E. Schatzel

[57] ABSTRACT

An arc discharge light pipe comprised of a sapphire light pipe, a cathode, and an anode. The anode is a hollow cylinder with an end cap having an aperture therein. The pointed cathode and the end cap of the anode form an arc gap which produces a conical arc discharge. The light from the conical arc discharge passes through the aperture into the hollow anode. The sapphire light pipe is positioned inside the hollow anode to collect the light and focus it on a desired point.

15 Claims, 4 Drawing Sheets

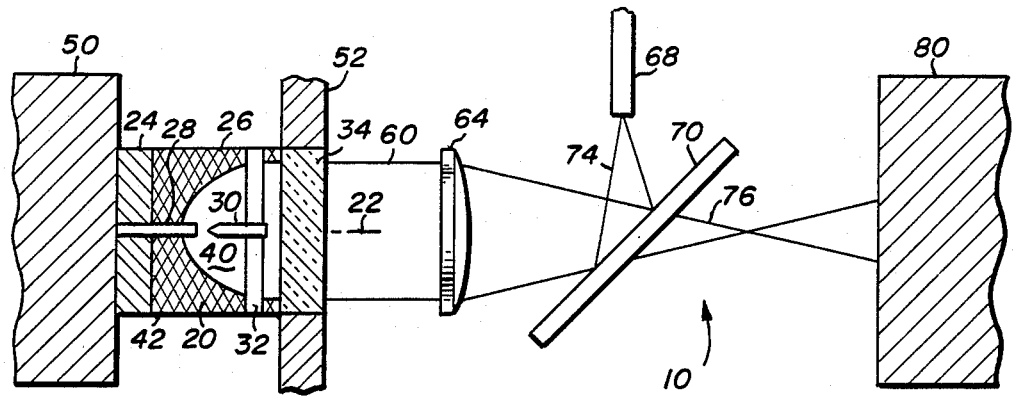
Fig_1 PRIOR ART
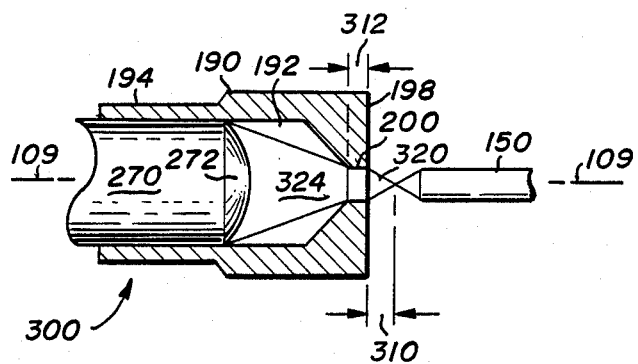
Fig_3
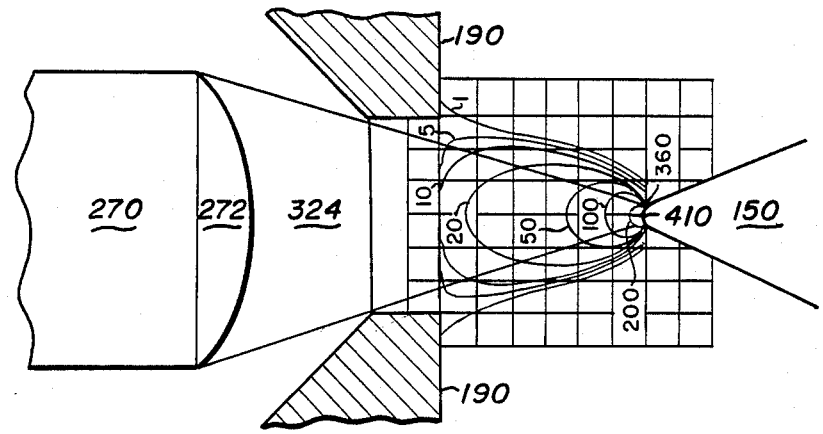
Fig_4

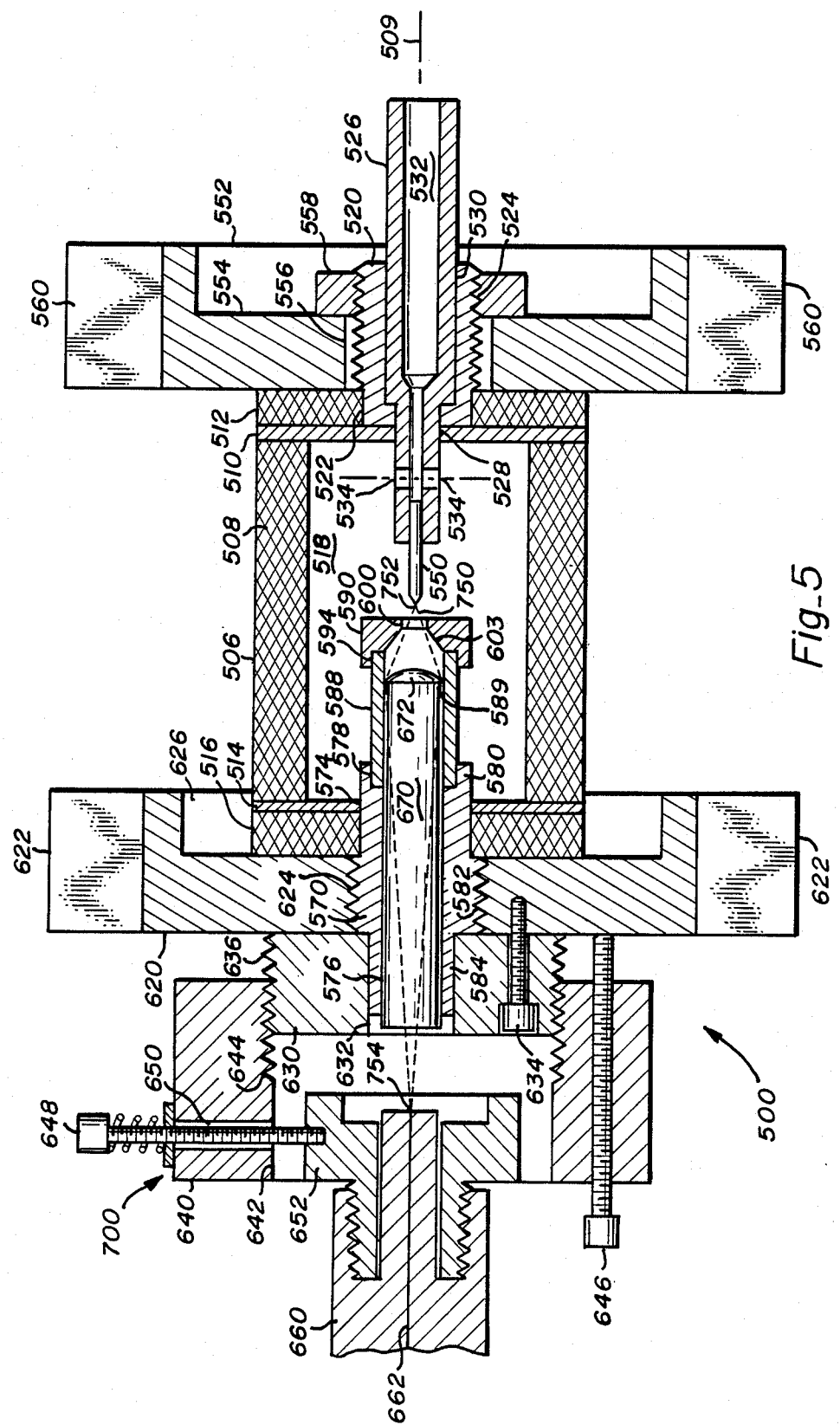
Fig_5

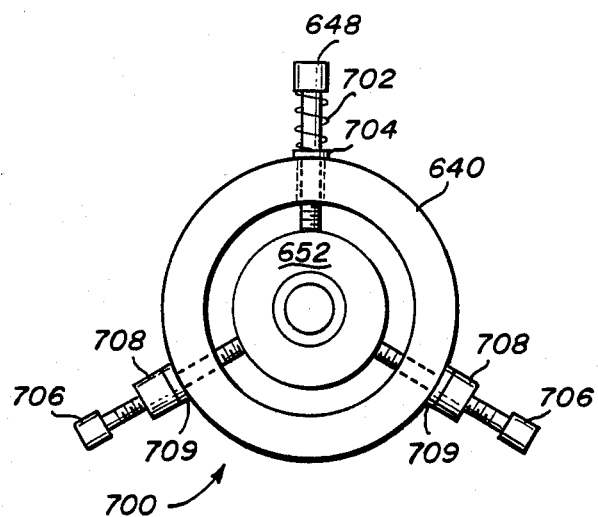
Fig_6
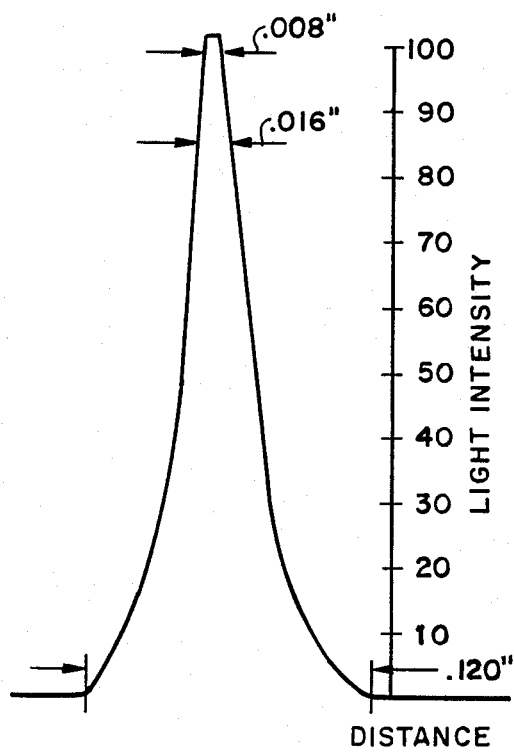
Fig_7
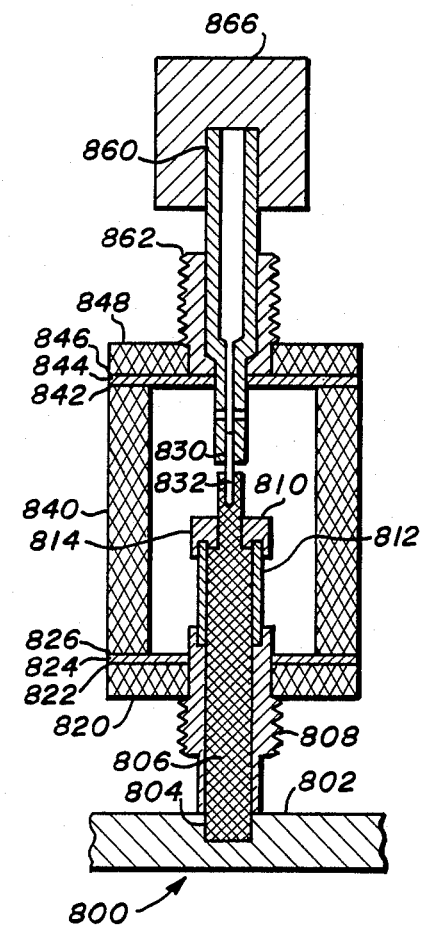
Fig_8

LENS PIPE ARC LAMP

This is a continuation-in-part of co-pending application Ser. No. 901,800 filed on 8/29/86 now abandoned.

BACKGROUND OF THE INVENTION

1. Field of the Invention

The invention relates generally to arc lamps and more particularly to arc lamps for use with fiber optic bundles.

2. Description of the Prior Art

Arc lamps are used to provide intense point sources of light for applications such as instrumentation and projection. Medical endoscopes are one type of application. In endoscopes, the arc lamps serve as illuminators of fiber optic bundles that allow visual examination of the body canals and adjacent organs without conventional surgery. Arc lamps are also used in industrial endoscopes to examine structures and components which are difficult to inspect visually, such as the interiors of jet engines.

Recently, medical science has started to use fiber optic bundles to examine smaller body canals, such as the coronary arteries. In order to achieve this, the fiber bundles cannot exceed one millimeter in diameter. In the past, fiber bundles have been at least four millimeters in diameter. In order to achieve fiber bundles of less than one millimeter in diameter, each individual fiber cannot exceed two hundred microns in diameter. It is thus necessary to have a light source which can provide a highly intense point of light to a fiber of two hundred microns or less.

A typical prior art arc lamp system for use with a fiber optic bundle is shown in FIG. 1 and is designated by the general reference number 10. An arc lamp 20 is generally symmetrical about an axis 22 and includes a base 24, a body 26, an anode 28, a cathode 30, a plurality of cathode support arms 32 and a window assembly 34. The base 24 is generally formed out of iron. The body 26 is usually made of a ceramic material.

The body 26 includes a concave cavity 40 which defines a curved reflective surface 42. Reflective surface 42 has a reflective metal coating deposited thereon. Anode 28 passes from the base 24 through the body 26 and extends from the back of reflective surface 42 into cavity 40 along axis 22. Cathode support arms 32 extend radially from body 26 toward axis 22. Cathode 30 is mounted to support arms 32 along axis 22. The window 34 fits sealingly against body 26 so that cavity 40 is gas tight. Window 34 is made of a transparent material. In operation, the cavity 40 is filled with an inert gas, such as xenon, at a pressure of several atmospheres. The lamp is illuminated when a breakdown voltage is present across the arc gap, thereby resulting in an illuminating flow of electrons (i.e., arc discharge) across the gap from the cathode 30 to the anode 28. Typically, such lamps operate from about one hundred fifty to eight hundred watts.

A first heat sink 50 is attached to base 24. Heat sink 50 absorbs the heat from base 24. A second heat sink 52 is attached to window 34 to draw off heat generated in the window 34.

The light 60 emerges from arc lamp 20 and passes through a lens 64. Lens 64 is needed to concentrate light 60 into a beam small enough for use with a fiber optic bundle 68. Before light 6 enters bundles 68, it is filtered by a cold mirror 70. Cold mirror 70 reflects visible light 74 to bundle 68, but allows infrared light to pass through to a third heat sink 80. Heat sink 80 dissipates the heat from infrared light 76.

There are several problems with this prior art system. One problem is that the system is bulky and involves a large number of components. Another problem is that the positioning of such components as the reflector 42, with respect to the cathode 30, lens 64, and mirror 70 must be exact. Even slight deviations in the alignment of these components can be critical. Another problem is that the reflector forms holes in the beam of light. These beam hole patterns in the light prevent the generation of a uniform light source.

Another prior art system is shown in U.S. Pat. No. 3,770,338, by James Helmuth. A light conducting pipe is inserted into an arc lamp envelope perpendicular to the electrodes. The light conducting pipe gathers light from the entire arc plume. However, the plume is not uniform in intensity and therefore, the light collected is asymmetrical. In addition, the light provided is not a highly focused intense point of light needed for optical fibers of two hundred microns or smaller.

SUMMARY OF THE PRESENT INVENTION

It is therefore an object of the present invention to provide a fiber optic arc lamp which is compact in size.

It is a further object to provide a fiber optic arc lamp which does not require the use of a reflector.

It is another object to provide a fiber optic arc lamp which does not have beam hole patterns.

It is another object of the present invention to provide an arc lamp which can image a high intensity point source of light energy into a fiber optics light guide bundle having a typical diameter between fifty and two hundred microns.

It is a further object to provide a fiber optic arc lamp with direct imaging of the arc's hot spot into a light guide conduit without the intermediate reflector stage.

It is another object to provide a fiber optic arc lamp where improved spatial qualities are achieved by directly imaging the lamp's arc hot spot using a small diameter light guide in close proximity to the source, wherein the diameter of the light guide can be matched to the size of the plasma arc.

Briefly, in a preferred embodiment, the present invention includes a ceramic body having a cylindrical cavity formed therein containing pressurized gas. A cathode is mounted to extend through a first end of the body along an axis of the cylindrical cavity. The cathode is rod-shaped with a distal end tapered to a point and the distal end extends into the cavity. An anode is mounted to extend through a second end of the body and extends along the axis of the cylindrical cavity. The anode is a hollow cylinder. The distal end of the anode extends into the cavity and has an end cap. The tapered end of the cathode and the end cap of the anode form an arc gap. The end cap of the anode has an aperture.

A cylindrical sapphire light pipe is sized to fit inside the hollow anode and passes from inside the cavity to outside the body. Light from the arc gap passes through the aperture in the anode and hits the sapphire light pipe. The pipe has a curved end surface opposite the aperture to focus the light from the arc is hot spot. This small high intensity point of light is imaged onto; a fiber optic bundle outside the body.

An advantage of the present invention is that it provides a fiber optic arc lamp which is compact in size.

It is a further advantage of the present invention in that it provides a fiber optic arc lamp which does not require the use of a reflector.

It is another advantage of the present invention in that it provides a fiber optic arc lamp which does not have beam hole patterns characteristic of arc lamps with reflector optics.

It is another advantage of the present invention, to provide an arc lamp which can image a high intensity point source of light energy into a fiber optics light guide conduit having a typical diameter of between fifty and two hundred microns.

It is a further advantage in that it provides a fiber optic arc lamp with direct imaging of the arc's hot spot into a light guide conduit without the intermediate reflector stage.

It is another advantage in that it provides a fiber optic arc lamp where improved spatial qualities are achieved by directly imaging the hot spot using a small diameter light guide in close proximity to the source, wherein the diameter of the light guide can be matched to the size of the plasma arc.

These and other objects and advantages of the present invention will no doubt become obvious to those of ordinary skill in the art after having read the following detailed description of the preferred embodiment which is illustrated in the various drawing figures.

IN THE DRAWINGS

FIG. 1 is a cross-sectional view of an arc lamp of the prior art as previously discussed;

FIG. 3 is a cross-sectional view of a portion of the arc discharge light pipe of FIG. 2;

FIG. 4 is a cross-sectional view of the arc discharge showing the light intensity distribution;

FIG. 5 is a cross sectional view of a second embodiment of the present invention;

FIG. 6 is a side view of an adjustable connector of FIG. 5;

FIG. 7 is a graph of a beam scan of the present invention; and

FIG. 8 is a cross-sectional view of the invention of FIG. 5 during manufacture.

DETAILED DESCRIPTION OF THE PREFERRED EMBODIMENT

Figure 2:
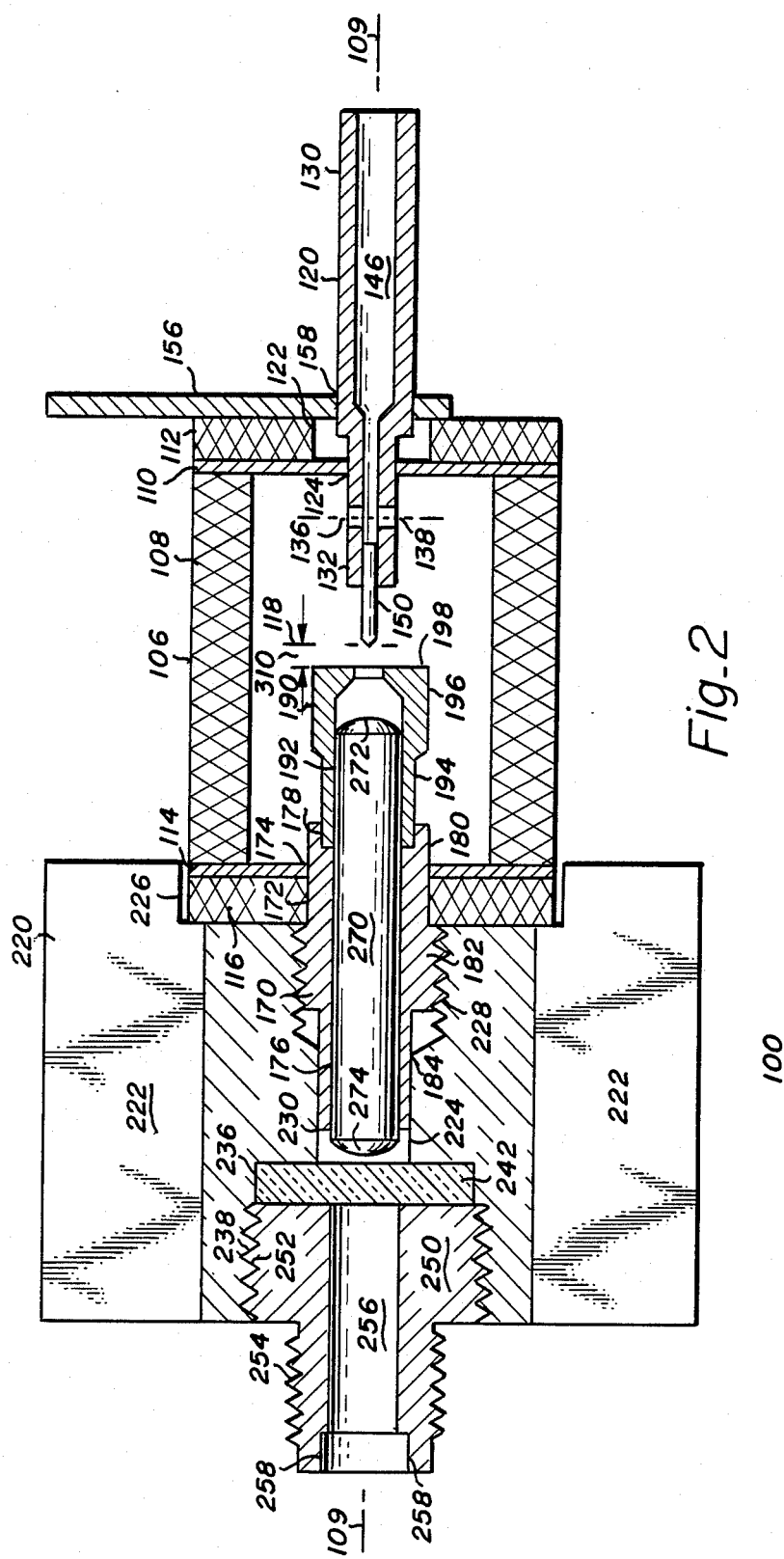
FIG. 2 is a cross-sectional view of an arc discharge light pipe of the present invention.

FIG. 2 shows an arc discharge light pipe of the present invention and is referred to by the general reference number 100. A body 106 is comprised of a ceramic cylinder 108 having an axis 109, a cathode inner ring 110, a cathode back-up ring 112, an anode inner ring 114, and an anode back-up ring 116. The inner rings 110 and 114 are made of a Kovar material and are copper brazed to the ends of the ceramic cylinder 108. The back-up rings 112 and 116 are made of a ceramic material. Back-up ring 112 is copper brazed to inner ring 110 and back-up ring 116 is copper brazed to inner ring 114. An air-tight cavity 118 is formed inside cylinder 108.

A cathode support 120 is passed through an aperture 122 of back-up ring 112 and an aperture 124 of inner ring 110 along axis 109. Support 120 is a hollow tube made of nickel. Support 120 has a section 130 having a diameter greater than aperture 124, but less than aperture 122, and a section 132 which has a diameter approximately equal to aperture 124. Section 32 extends into cavity 118. Support 120 is copper or silver brazed to inner ring 110. A pair of gas venting holes 136 and 138 pass perpendicularly through section 132 of support 120 and intersect the inner surface of support 120. The inner surface of support 120 defines a passageway 146.

A cathode 150 extends from support 120 along axis 109. Cathode 150 is rod-shaped and fits partially inside passageway 146. Cathode 150 is made of tungsten and is brazed to support 120. The distal end of cathode 150 is tapered to a point at an angle of approximately fifty degrees relative to axis 109.

A tab 156 is copper brazed to cathode support 120. The tab 156 is a flat steel strip with a hole 158 at one end. Hole 158 is sized such that section 130 of cathode support 120 fits through it. Tab 156 extends beyond the outer edge of back-up ring 112 perpendicularly to axis 109.

An anode support 170 is passed through aperture 172 of back-up ring 116 and aperture 174 of inner ring 114 along axis 109. Anode support 170 is a hollow tube made of Kovar material. Support 170 has an inner passageway 176 and a countersunk section 178. Support 170 has an anode section 180 which has a diameter approximately equal to aperture 172 and 174, a screw section 182 which has a diameter greater than anode section 180 and a rear section 184 which has a diameter less than anode section 180. Support 170 is copper or silver brazed to inner ring 114.

An anode 190 is made of tungsten and shaped like a hollow cylinder with an inner passageway 192. Passageway 192 is the same diameter as passageway 176 of support 170. Anode 190 has a support section 194 which has a diameter approximately equal to countersunk section 178 of support 170. Anode 190 is positioned along axis 109 with support section 194 partially fitting inside countersunk section 178. Anode 190 is copper brazed to support 170. Anode 190 has an arc section 196 which has a diameter greater than support section 194. Anode 190 has an end cap 198 at the end of arc section 196. An aperture 200 passes through end cap 198 along axis 109. Aperture 200 has a smaller diameter than passageway 192. Passageway 192 is tapered at a forty-five degree angle to axis 109 to meet aperture 200.

A heat sink 220 is cylindrically shaped and has a plurality of fins 222 extending radially outward from the side of the cylindrical section. Heat sink 220 is made of aluminum. Heat sink 220 is positioned along axis 109. An inner passageway 224 is symmetrical about axis 109. A countersunk section 226 allows heat sink 220 to fit around the outer edge of back-up ring 116. A screw section 228 of passageway 224 mates with screw section 182 of support 170. A section 230 of passageway 224 has a diameter approximately equal to rear section 184 of support 170 such that rear section 184 fits inside section 230. A filter section 236 of passageway 224 is located behind section 230 along axis 109 and has a diameter greater than section 230. A connector screw section 238 of passageway 224 is located along axis 109 behind section 236.

A heat absorbing filter 242 is positioned inside section 236 of heat sink 220. Filter 242 is disk-shaped and made of glass. A cylindrical fiber optic connector 250 has a screw section 252 which mates with screw section 238 of heat sink 220. Connector 250 has a screw section 254 for mating with a fiber optic bundle. Connector 250 has an inner passageway 256 symmetrical about axis 109 which has a diameter approximately equal to passageway 176 of anode support 170. A pair of slots 258 are located in passageway 256 at the outer end of screw section 254 for connecting with a fiber optic bundle. Connector 250 is made of aluminum.

A cylindrical sapphire light pipe 270 is positioned inside passageway 176 of support 170 and passageway 192 of anode 190. The diameter of pipe 270 is approximately equal to the diameter of passageways 176 and 192. Pipe 270 should be long enough to allow heat from anode 190 to dissipate before reaching fiber optic connector 250. Pipe 270 has a curved surface 272 at one end to focus light. A second curved surface 274 may be provided at the other end to further focus the light.

FIG. 3 shows the arc gap section of arc discharge light pipe 100 and is referred to by the general reference number 300. Cathode 150 has a diameter of 0.032 inches and aperture 200 has a diameter of 0.031 inches. An arc gap 310 from the tip of cathode 150 to anode 190 is 0.020 inches. Aperture 200 extends a distance 312 of 0.015 inches deep.

In operation, the cavity 118 is filled with xenon gas to seventeen atmospheres through passageway 146 of cathode support 120 and then the passageway 146 is sealed. Light is produced when the breakdown voltage is exceeded across arc gap 310. Typical breakdown voltage is 25,000 volts. The flow of electrons across the gap from cathode 150 to anode 190 creates an arc discharge or plasma 320 which is cone-shaped. The conical arc discharge 320 produces a stream of light 324 inside passageway 192 of anode 190. Aperture 200 functions as a light guide.

Light pipe 270 is positioned in passageway 192 such that the light 324 is distributed across its end surface 272. Surface 272 is curved to focus the light through light pipe 270 and filter 242 to a fiber optic bundle held in fiber optic connector 250. The filter 242, absorbs infrared heat and dissipates it through heat sink 220. Surface 274 provides further focusing of the light and allows the light to be focused on very small diameter fiber optic bundles (50 microns in size).

The present invention does not need a bulky reflector to gather light because the light pipe 270 is positioned near arc gap 310. The unique placement of the light pipe 270 in anode 190 makes the most efficient use of the light generated by the conical arc discharge 320.

FIG. 4 shows a cross-sectional view of the arc discharge with the light intensity distribution. Each line represents constant luminous intensity measured in candelas per square milimeter. The curved surface 272 is focused on the hottest and most intense light region of the arc, which is a point 410 at the tip of cathode 150.

FIG. 5 shows a second embodiment of an arc discharge light pipe of the present invention and is referred to by the general reference number 500. A body 506 is comprised of a ceramic cylinder 508 having an axis 509, a cathode inner ring 510, a cathode back-up ring 512, an anode inner ring 514, and an anode back-up ring 516. The inner rings 510 and 514 are made of a Kovar material and are copper brazed to the ends of the ceramic cylinder 508. The back-up rings 512 and 516 are made of a ceramic material. Back-up ring 512 is copper brazed to inner ring 510 and back-up ring 516 is copper brazed to inner ring 514. An air tight cavity is formed inside cylinder 508. The cylinder 508 is 0.56 inches long, 0.10 inches thick and has a diameter of 0.63 inches. The inner rings 510 and 514 are 0.02 inches thick and the back-up ring 512 and 516 are 0.075 inches thick.

A cathode holder 520 is passed through an aperture 522 of back-up ring 512. Holder 520 is copper or silver brazed to inner ring 510. The holder 520 is a hollow cylinder made of Kovar material and has a thread screw section 524. A cathode support 526 is passed through an inner passage 530 of cathode holder 520 and an aperture 528 of inner ring 510. Support 526 is a hollow tube made of nickel and has an inner passage 532. Support 526 is copper or silver brazed to holder 520. A pair of gas vent holes 534 pass through support 526 and intersect passage 532.

A cathode 550 extends from support 526 along axis 509. Cathode 550 is rod shaped with a diameter of 0.03 inches and fits partially inside passageway 532. Cathode is made of tungsten and is brazed to support 526. The distal end of cathode 550 is tapered to a point of an angle of approximately fifty degrees relative to axis 509.

A cylindrical heat sink 552 has a countersunk section 554 and a central aperture 556. The aperture 556 is sized to fit around holder 520 such that heat sink 552 abuts back-up ring 512. A nut 558 mates with screw section 524 and holds heat sink 552 in place. A plurality of fins 560 extends radially outward. Heat sink 552 is made of gold anodized aluminum.

An anode support 570 is passed through an aperture 572 of back-up ring 516 and an aperture 574 of inner ring 514 along axis 509. Anode support 570 is a hollow tube made of Kovar material. Support 570 has an inner passageway 576 and a countersunk section 578. Support 570 has an anode section 580 which has diameter approximately equal to aperture 572 574, a screw section 582 which has a diameter greater than anode section 580 and a rear section 584 which has a diameter less than anode section 580. Support 570 is copper or silver brazed to inner ring 514.

A cylindrical molybdenum sleeve 588 fits into section 578 of support 570 and is copper or silver brazed in place. Sleeve 588 has an inner passage 589. An anode is made of tungsten and shaped like a hollow cylinder and has diameter of 0.018 inches. Anode 590 has a countersunk section 594 shaped to fit over end of the sleeve 588. Anode 590 is positioned along axis 509. Anode 590 is platinum brazed to sleeve 588. An aperture 600 passes through anode 590 along axis 509 and has a diameter of 0.03 inches and is 0.015 inches deep. Aperture 600 has a smaller diameter than passageway 589. A tapered section 602 tapers at a forty-five degree angle to axis 109 to meet aperture 600 from passageway 589. Anode 590 is located 0.02 inches from the tip of cathode 550.

A heat sink 620 is cylindrically shaped and has plurality of fins 622 extending radially outward from the side of the cylindrical section. Heat sink 620 is made of gold anodized aluminum. Heat sink 620 is position along axis 509. An inner screw thread passage 624 is symmetrically located about axis 509 and mates with screw thread section 582 of anode support 570. A countersunk section 626 allows heat sink 620 the fit around the outer edge of back-up ring 516.

A stainless steel cylindrical plate 630 has an aperture 632 sized to fit around rear section 584 of anode support 570. The plate 630 is attached to heat sink 620 by means of a plurality of screws 634 (only one of which is shown). Plate 630 has a thread screw section 636 around its outer circumference.

An adjustment cylinder 640 has an internal aperture 642. Cylinder 640 is made of Delrin material. The Delrin material acts as a heat shield. A portion of aperture 642 has a screw thread section 644 which mates with screw section 636 of plate 630. A stop screw 646 passes through cylinder 640 parallel to axis 509 and abuts heat sink 620. A screw 648 passes through a radial aperture 650 of cylinder 640 and screws into connector 562. Two other screws (not shown), in addition to screw 648, are equally spaced around cylinder 640 and screw into connector 652. A standard SMA fiber optic connector 666 mates with connector 652. Connector 666 contains an optic fiber 662 which is two hundred microns or less in diameter.

A cylindrical sapphire light pipe 670 is positioned inside passageway 576 of support 570 and passageway 589 of sleeve 588. The diameter of pipe 670 is approximately equal to the diameter of passageway 576 and 589, or about 0.12 inches. Pipe 570 has a curved surface 572 located behind anode 590. The curved surface has radius of curvature of 0.114 to 0.116 inches. Pipe 570 is 0.630 inches long.

FIG. 6 shows a side elevation view of the adjustable connector of FIG. 5 and is referred to by the general reference number 700. Screw 648 has a spring 702 and a washer 704 between its head and cylinder 640. Two other screws, 706, are spaced an equal distance apart from each other and screw 640. Screws 706 pass through cylinder 640 in a radial direction and screw into connector 652. Each of screws 706 has an adjustment nut 708 and a washer 709. Spring 702 tends to pull connector 752 in an upward direction. By adjusting nut 708, the connector 652 can be moved in an up or down or side-to-side direction relative to cylinder 640. This movement is in a plane perpendicular to axis 509.

Returning now to FIG. 5, in operation, the cavity 518 is filled with Xenon gas to seventeen atmospheres pressure through passageway 532 of cathode support 526 and then the passage 532 is sealed. Light is produced when the breakdown voltage is exceeded across the arc gap. Typical breakdown voltage is 25,000 volts. The flow of electrons crossing the gap from cathode 550 to anode 590 creates an arc discharge or a plasma 750 which is of a hollow cone shape. See also FIG. 4.

At the tip of cathode 550, a hot spot 752 exists which is the hottest and brightest point in plasma 750. See FIG. 4. Light pipe 670 is located about 0.180 inches from hot spot 752. The surface 672 is shaped to focus the image of the hot spot 752 to point 754 a distance of 0.050 to 0.0100 inches behind light pipe 670. By using adjustment connector 700, the fiber 662 is moved until its end meets point 754 By rotating cylinder 640 along screw section 636, the fiber can be moved along axis 509. By adjusting nuts 708, the fiber can be moved in a plane perpendicular to axis 509. Thus, the present invention directly images the bright and small point of light from hot spot 752 directly into a small fiber 662 of two hundred microns or less in diameter. Since pipe 670 is focused only on point 752, the other less bright portions of the plasma 750 are ignored. The typical light pipe transfers light by reflecting off the side walls. This decreases the intensity of the light. Here the light is not reflected off the walls, but a point source is being directly imaged. Only the end surfaces of the light pipe 670 need to be polished. The side walls of light pipe of 670 do not need to be polished.

FIG. 7 shows a graph of a beam scan using the present invention. A light detector with an aperture of 0.015 inches was moved in a line perpendicular to axis 509 at point 754. The light pipe 570 has a diameter of 0.120 inches. At point 754 the light intensity reaches a sharp maximum, this is the image of the hot spot 752 of plasma 750. Note also that because the light pipe is located directly inside an behind the plasma cone 750, the light intensity pattern is symmetrical. The present invention is able to provide a very small, but intense point of light directly to a very small optic fiber.

FIG. 8 shows a cross sectional view of a light pipe arc lamp of the present invention during manufacture and is designated by the general reference number 800. A stainless steel base 802 provides support. A counter bore 804 holds a ceramic jig 806. An anode support 808 is placed on jig 806. Next, an anode assembly 810 is placed on ceramic support 808. Anode assembly 810 is comprised of a sleeve 812 and an anode 814 which have been previously attached by means of a platinum braze.

Next, a back-up ring 820, a braze washer 822, an inner ring 824, and a braze washer 826 are all placed on anode support 808. A cathode 830 is placed inside a hole 832 in jig 804. A body 840 is placed on braze washer 826. A braze washer 842, an inner ring 844, a braze washer 846 and a back-up ring 848 are then placed on body 840. A cathode support 860 and a cathode holder 862 are then placed on inner ring 844 and the cathode support 860 extends through inner ring 844 and receives cathode 830. A weight 866 may then be attached to the top of cathode support 860 to hold the cathode support 860 and the cathode 830 securely in place. The entire assembly 800 is then brazed in a one step operation.

The weight 866 and jig 804 are the removed from assembly 800. A light pipe (not shown) is then brazed inside anode support 808 and sleeve 812.

The unique design of the lamp of this invention lends itself to this simple method of manufacture. The hole in the anode can be used by the jig 804 to insure that the cathode is located in precisely the right position relative to the anode. Thus, the lamp of the present invention can be manufactured in large quantities with a high degree of precision in the alignment of each and every one.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. A lens pipe arc lamp comprising:
  a body formed of a dielectric material having formed therein a hollow cavity containing pressurized gas;
  a pair of electrodes mounted within said cavity with the distal ends of said electrode being spaced apart a distance to define an arc gap;
  a lens pipe means mounted to pass from outside the body through a wall of the body and into said cavity, with a fresh end having a lens surface positioned inside said cavity and a second end positioned outside the body, the lens surface having a first focal point located at a light point proximate the distal end of one of the electrodes said light point having the highest light intensity of an arc discharge of said arc gap and a second focal point located beyond said second end of said lens pipe means, the lens pipe means for direct imaging of light from said light point to said second focal point without reflection off of the inner surface of the lens pipe means; and
  an optic fiber connector attached to the body and positioned such that an optic fiber held in the optic fiber connector is positioned proximate said second focal point to receive said imaged light.

2. The device of claim 1 wherein,
said lens pipe means is made of sapphire, said first end and said second end having polished surface and said lens pipe means having side surfaces which are unpolished.

3. The device of claim 1 wherein,
one of the electrodes is a cathode member, mounted to a wall of the body, said cathode member having its distal end tapered to a point; and
the other of the electrodes is a anode member mounted to a wall of said body, said anode member sized to fit over the first end of said lens pipe means, the distal end of said anode having an aperture to allow passage of light from said first focal point to the lens pipe means said distal end of said anode together with said point of said cathode forming said arc gap.

4. The device of claim 3 further including,
a first heat sink attached to said anode and a second heat sink attached to said cathode.

5. The device of claim 1 wherein,
the electrodes and the lens pipe means are positioned along an axis.

6. The device of claim 1 further including,
a heat absorbing filter positioned at said second end of said lens pipe means.

7. The device of claim 36 further including,
a heat sink attached to the body and the filter.

8. A lens pipe arc lamp comprising:
a body made of a dielectric material having a cavity filled with pressurized gas;
a cathode mounted about a first end of said cavity and extending into said cavity along an axis, and having a distal end tapered to a point;
an anode mounted about a second end of said cavity and extending into said cavity along said axis, the anode having an inner passageway extending outside the body and an end portion at its distal end, an aperture passing through said end portion along said axis, the distal end of the anode and cathode spaced a distance apart to define an arc gap, an arc discharge of said arc gap being of a conical shape with said aperture located at a base of said conical shaped arc discharge;
a sapphire lens pipe means sealably mounted inside said passageway along said axis and having a lens surface along a first end located opposite said aperture and a second end positioned outside the body, the lens pipe means having a first focal point located at a light point proximate said distal end of the cathode, said light point having the highest light intensity of said arc discharge and a second focal point located beyond said second end of said lens pipe means, the lens pipe means for direct imaging of said light point to said second focal point without reflection off the inner surface of the lens pipe means; and
an optic fiber connector attached to the body and positioned such that an optic fiber held in the optic fiber connector is positioned proximate said second focal point to receive said imaged light.

9. The device of claim 8 further including,
a metallic heat sink attached to a portion of the anode which extend through said second end of said cavity outside the body, the heat sink having a heat sink passageway to receive the lens pipe means.

10. The device of claim 9 further including,
a heat absorbing filter positioned inside said heat sink passageway at said second end of said lens pipe means to absorb heat.

11. The device of claim 8 wherein,
the diameter of said anode passageway is greater than the diameter of said aperture, the diameter of said aperture being sized such that light from said light point falls across the entire surface area of said first end of said lens pipe means.

12. The device of claim 8 wherein,
said second end of the lens pipe means has a lens surface to further focus the light from said light point.

13. The device of claim 8 further including,
a first heat sink attached to said anode and a second heat sink attached to said cathode.

14. A lens pipe arc lamp comprising:
a body made of dielectric material having a cavity filled with pressurized gas;
a cathode mounted about a first end of said cavity and extending into said cavity along an axis, and having a distal end tapered to a point;
an anode mounted about a second end of said cavity and extending into said cavity along said axis, the anode having an inner passageway extending outside the body and an end portion at its distal end, an aperture passing through said end portion along said axis, the distal end of the anode and cathode spaced a distance apart to define an arc gap, an arc discharge of said arc gap being of a conical shape with said aperture located at a base of said conical shaped arc discharge;
a sapphire lens pipe means sealably mounted inside said passageway along said axis and having a convex surface along a first end located opposite said aperture and a second end positioned outside the body, the lens pipe means having a first focal point located at a hot spot of said arc discharge and a second focal point located beyond said second end of said lens pipe means, the lens pipe means for imaging said hot spot to said second focal point; and
an optic fiber connector attached to the body and positioned such that an optic fiber held in the optic fiber connector is positioned proximate said second focal point to receive said imaged hot spot light, the optic fiber connector has adjustment means to move the optic fiber in three axes of direction relative to said second focal point.

15. The device of claim 14 wherein,
the optic fiber connector comprises a cylinder having a passageway and connected to the body by screw thread means, a fiber connector located within said passageway, a plurality of adjustment screws connecting said cylinder and said fiber connector.

* * * * *